United States Patent
Chan et al.

(10) Patent No.: US 12,038,598 B1
(45) Date of Patent: Jul. 16, 2024

(54) TOUCH MODULE

(71) Applicant: Primax Electronics Ltd., Taipei (TW)

(72) Inventors: Wei-Ping Chan, Taipei (TW); Ming-Hui Yeh, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 18/381,595

(22) Filed: Oct. 18, 2023

(30) Foreign Application Priority Data

Dec. 29, 2022 (TW) .................................. 111150717

(51) Int. Cl.
*F21V 8/00* (2006.01)
*G06F 3/041* (2006.01)

(52) U.S. Cl.
CPC ........... *G02B 6/0088* (2013.01); *G06F 3/041* (2013.01)

(58) Field of Classification Search
CPC ............................... G02B 6/0088; G06F 3/041
See application file for complete search history.

(56) References Cited

U.S. PATENT DOCUMENTS 11,182,006 B1 * 11/2021 Ho ........................ G02B 6/0068
11,928,294 B2 * 3/2024 Zhou ....................... B32B 17/10
2021/0370658 A1 * 12/2021 Zhang ................. B32B 37/1292

* cited by examiner

*Primary Examiner* — Thomas M Sember
(74) *Attorney, Agent, or Firm* — KIRTON McCONKIE; Evan R. Witt

(57) ABSTRACT

A touch module includes a touch sensor panel, a light guide plate, an adhesive layer and a shielding body. The touch sensor panel includes an opening. The adhesive layer includes a groove part. The light guide plate is located over the touch sensor panel. The adhesive layer is arranged between the touch sensor panel and the light guide plate. The touch sensor panel and the light guide plate are attached on each other through the adhesive layer. The groove part of the adhesive layer is in communication with the opening of the touch sensor panel to exhaust the gas. The shielding body surrounds the edge part of the light guide plate and the outer periphery part of the touch senor panel. Due to the shielding body, the light beam transferred in the light guide plate will not be leaked out.

9 Claims, 3 Drawing Sheets

TOUCH MODULE

FIELD OF THE INVENTION

The present invention relates to a touch-sensitive input device, and more particularly to a touch module.

BACKGROUND OF THE INVENTION

Generally, a conventional touch module comprises a touch sensor panel, a circuit layer, a top touch plate, an adhesive layer and some other plates. These plates have their respective functions. In addition, these plates are stacked on and adhered to each other to form a plate-shaped multilayered structure. Recently, a touch module with the illuminating capability has been introduced into the market. This touch module is further equipped with a light guide plate and a light source, and thus the illuminating function can be provided.

However, while the plural plates of the multilayer structure of the touch module are stacked on and adhered to each other, some problems possibly occur. For example, in the adhering process, gases are readily trapped in the regions between the adjacent plates. Consequently, gas bubble gaps are generated in the regions between these plates. Since the gas bubble gaps are formed between the plates, the touch-sensing sensitivity of the touch module is adversely affected, and the assembling tightness of the touch module is destroyed. Also, the illuminating efficacy of the illuminated touch module is impaired.

SUMMARY OF THE INVENTION

For solving the drawbacks of the conventional technologies, the present invention provides a touch module. The touch module includes a touch sensor panel and an adhesive layer. The touch sensor panel includes at least one small exhaust opening. The adhesive layer includes at least one groove part. When gases are trapped between the adjacent plates of the touch module, gases can be transferred to the exhaust opening of the touch sensor panel through the groove part of the adhesive layer. That is, the gases can be exited to the surroundings. Since the gases are not accumulated in the touch module, the operations of the touch module are not affected, or the structure of the touch module is not destroyed. The touch module further includes a light guide plate and a shielding body. The light guide plate is adhered on the touch sensor panel through the adhesive layer. Consequently, the touch module has the illuminating function. The outer periphery part of the touch sensor panel and the edge part of the light guide plate are sealed by the shielding body. Consequently, gases will not pass through the periphery seam of the touch module to affect the operations of the touch module. In addition, the light beam transferred in the light guide plate will not be leaked out from the periphery region of the touch module.

In accordance with an aspect of the present invention, a touch module is provided. The touch module includes a touch sensor panel, a light guide plate, an adhesive layer and a shielding body. The touch sensor panel includes a top surface, a bottom surface and at least one opening. The light guide plate includes a connecting surface and an edge part. The light guide plate is located over the touch sensor panel. The connecting surface of the light guide plate is aligned with the top surface of the touch sensor panel. The adhesive layer includes at least one groove part. The adhesive layer is arranged between the touch sensor panel and the light guide plate. The touch sensor panel and the light guide plate are attached on each other through the adhesive layer. The shielding body is arranged between the touch sensor panel and the light guide plate. The edge part of the light guide plate is surrounded by the shielding body. The at least one groove part of the adhesive layer is in communication with the at least one opening of the touch sensor panel.

In an embodiment, the touch module further includes at least one light-emitting element. The at least one light-emitting element is installed on the touch sensor panel and aligned with the edge part of the light guide plate. When the at least one light-emitting element emits a light beam, the light beam is introduced into the light guide plate through the edge part of light guide plate.

In an embodiment, the shielding body surrounds and shields the edge part of the light guide plate. After the light beam from the light-emitting element is introduced into the light guide plate, the light beam is blocked by the shielding body. Consequently, the light beam is not leaked from the edge part of the light guide plate.

In an embodiment, the top surface and the bottom surface of the touch sensor panel are opposed to each other, the top surface of the touch senor panel is aligned with the adhesive layer and the light guide plate, the at least one opening of the touch sensor panel is extended from the top surface to the bottom surface, and the at least one opening of the touch sensor panel is in communication with surroundings through the bottom surface of the touch sensor panel.

In an embodiment, each of the at least one opening of the touch sensor panel has a first end and a second end. The first end is formed in the top surface of the touch sensor panel. The second end is formed in the bottom surface of the touch sensor panel. The first end of each of the at least one opening is in communication with the corresponding groove part of the adhesive layer. The second end of each of the at least one opening is in communication with surroundings.

In an embodiment, the adhesive layer has a first surface and a second surface. The first surface and the second surface of the adhesive layer are opposed to each other. The first surface of the adhesive layer is aligned with the connecting surface of the light guide plate. The second surface of the adhesive layer is aligned with the top surface of the touch sensor panel.

In an embodiment, the at least one groove part of the adhesive layer is extended from the first surface of the adhesive layer to the second surface of the adhesive layer. The first surface and the second surface of the adhesive layer are in communication with each other.

In an embodiment, the at least one groove part of the adhesive layer is in communication with surroundings through the at least one opening of the touch sensor panel.

In an embodiment, the touch sensor panel includes an outer periphery part, and the outer periphery part surrounds an outer periphery region of the touch sensor panel. The shielding body is installed on the outer periphery part of the touch sensor panel and arranged around the edge part of the light guide plate.

In an embodiment, the touch senor panel further includes a conductive part. The conductive part is installed on the outer periphery part of the touch senor panel. The conductive part is aligned with the shielding body.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments and accompanying drawings.

Figure 1:
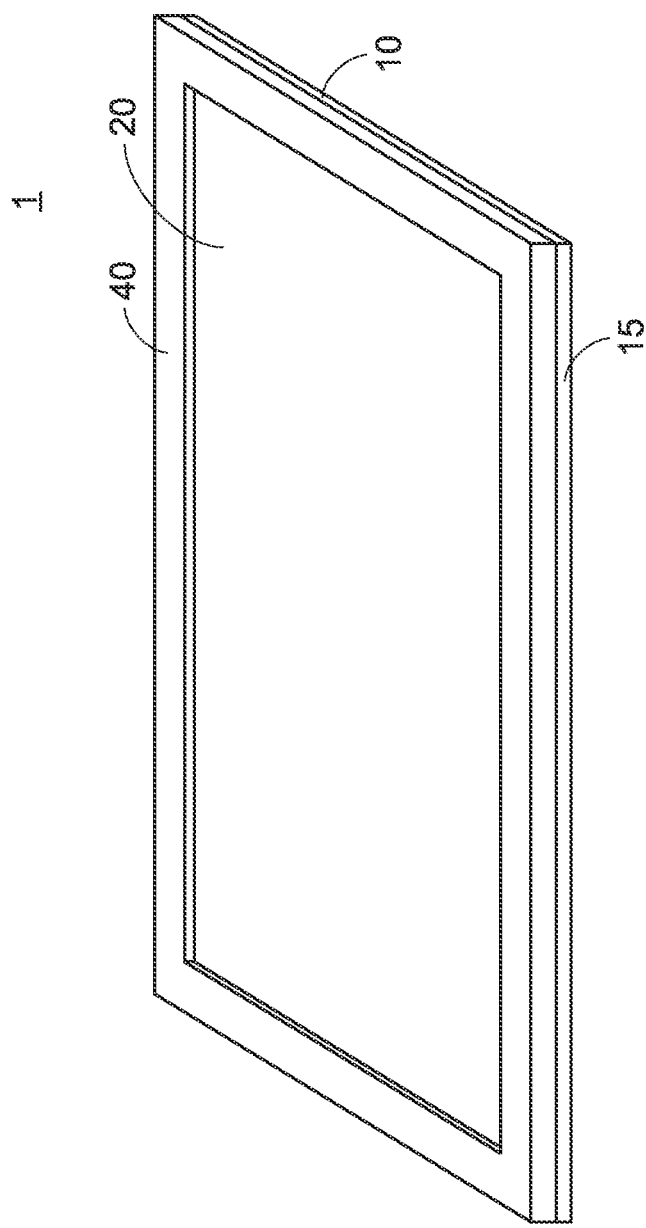
FIG. 1 is a schematic perspective view illustrating a touch module according to an embodiment of the present invention.
Figure 2:
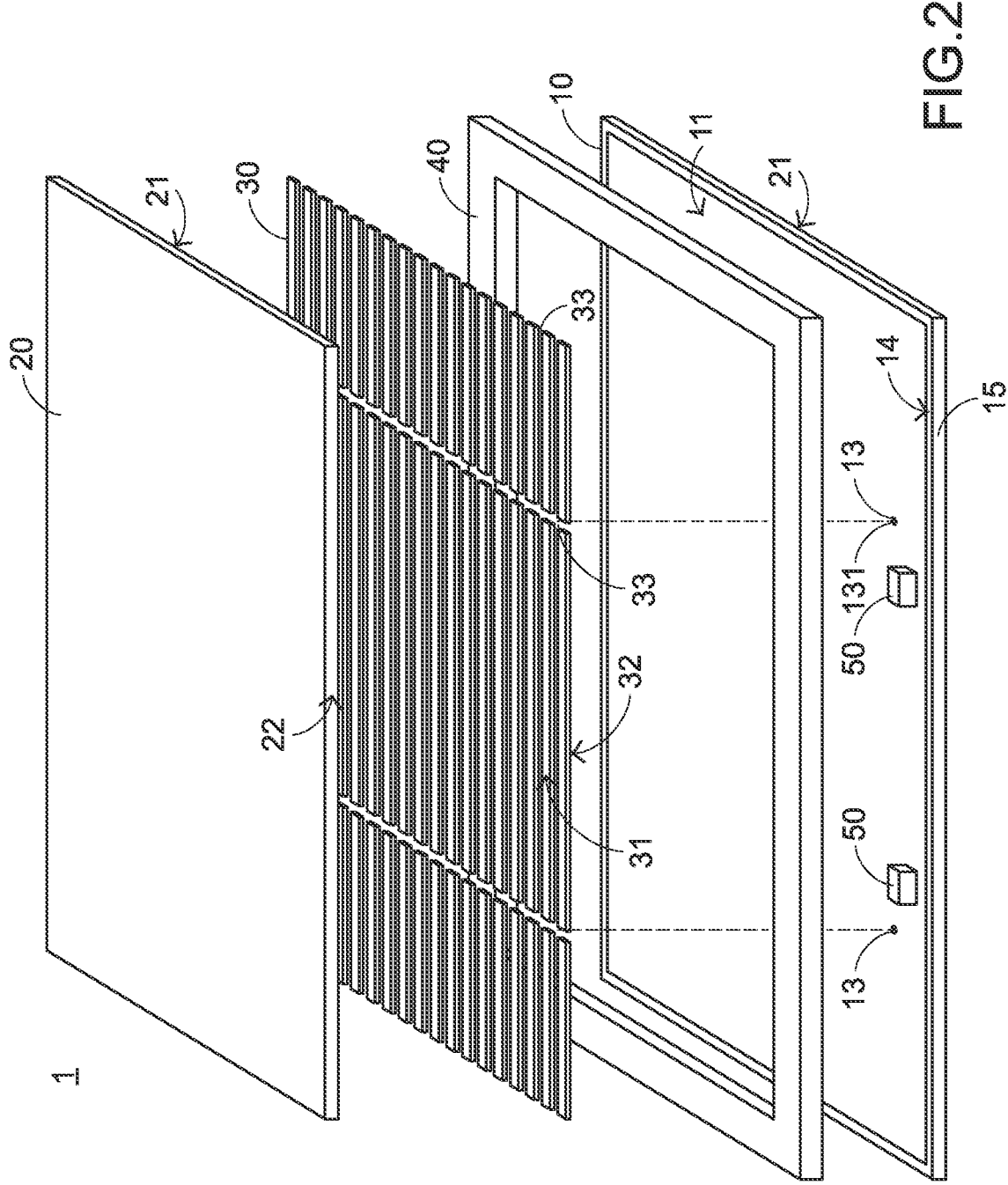
FIG. 2 is a schematic exploded view illustrating the touch module according to the embodiment of the present invention.
Figure 3:
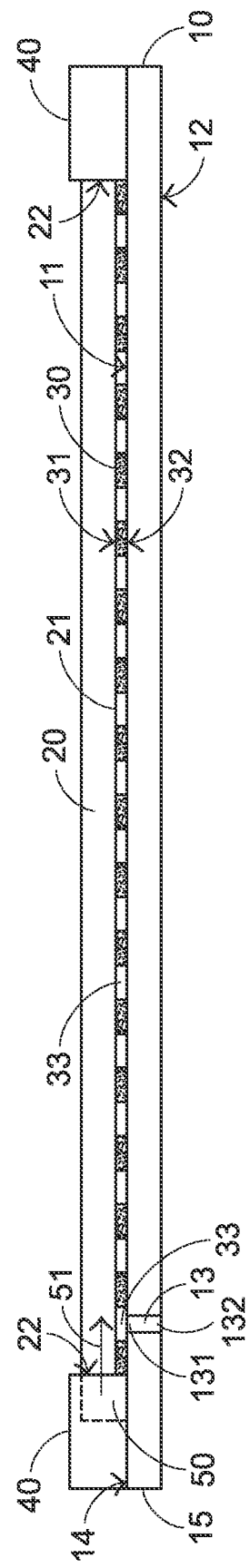
FIG. 3 is a schematic cross-sectional view illustrating the touch module according to the embodiment of the present invention.

FIG. 1 is a schematic perspective view illustrating a touch module according to an embodiment of the present invention. FIG. 2 is a schematic exploded view illustrating the touch module according to the embodiment of the present invention. FIG. 3 is a schematic cross-sectional view illustrating the touch module according to the embodiment of the present invention.

The touch module 1 comprises a touch sensor panel 10, a light guide plate 20, an adhesive layer 30, a shielding body 40 and at least one light-emitting element 50. The touch sensor panel 10 comprises at least one opening 13. The adhesive layer 30 comprises at least one groove part 33.

The light guide plate 20 is located over the touch sensor panel 10. The adhesive layer 30 is arranged between the light guide plate 20 and the touch sensor panel 10. The light guide plate 20 and the touch sensor panel 10 are attached on each other through the adhesive layer 30. The at least one groove part 33 of the adhesive layer 30 is in communication with the corresponding opening 13 of the touch sensor panel 10. The shielding body 40 is arranged between the touch sensor panel 10 and the light guide plate 20. In addition, the shielding body 40 is arranged around the edge part of the light guide plate 20. The at least one light-emitting element 50 is installed on the touch sensor panel 10. In addition, the at least one light-emitting element 50 is aligned with the light guide plate 20.

The touch sensor panel 10 further comprises a top surface 11, a bottom surface 12, an outer periphery part 14, and a conductive part 15. The opening 13 of the touch sensor panel 10 has a first end 131 and a second end 132. The top surface 11 and bottom surface 12 of the touch sensor panel 10 are opposed to each other. The top surface 11 of the touch sensor panel 10 is aligned with the light guide plate 20 and the adhesive layer 30. The opening 13 of the touch sensor panel 10 is extended from the top surface 11 to the bottom surface 12. In addition, the opening 13 of the touch sensor panel 10 is in communication with the surroundings through the bottom surface 12 of the touch sensor panel 10. The first end 131 of the opening 13 is formed in the top surface 11 of the touch sensor panel 10. The second end 132 of the opening 13 is formed in the bottom surface 12 of the touch sensor panel 10. Consequently, the first end 131 of the opening 13 is in communication with the groove part 33 of the adhesive layer 30, and the second end 132 of the opening 13 is in communication with the surroundings. The outer periphery part 14 of the touch sensor panel 10 is located at the outer periphery region of the touch sensor panel 10. The conductive part 15 of the touch sensor panel 10 is installed on the outer periphery part 14. In addition, the conductive part 15 is aligned with the shielding body 40. The conductive part 15 is used as an electrical conduction component of the touch sensor panel 10. For example, the conductive part 15 can be used for transferrin electric current or preventing from static electricity.

The light guide plate 20 comprises a connecting surface 21 and an edge part 22. The edge part 22 is located at the outer periphery region of the light guide plate 20. In addition, the connecting surface 21 is surrounded by the edge part 22. The connecting surface 21 of the light guide plate 20 is aligned with the top surface 11 of the touch sensor panel 10. The at least one light-emitting element 50 is aligned with the edge part 22 of the light guide plate 20. When the light-emitting element 50 emits a light beam, the light beam is introduced into the light guide plate 20 through the edge part 22 of light guide plate 20.

The adhesive layer 30 has a first surface 31 and a second surface 32. The first surface 31 and the second surface 32 are opposed to each other. The groove part 33 of the adhesive layer 30 is extended from the first surface 31 to the second surface 32. Consequently, the first surface 31 is in communication with the second surface 32 through the groove part 33. The first surface 31 of the adhesive layer 30 is aligned with and adhered to the connecting surface 21 of the light guide plate 20. The second surface 32 of the adhesive layer 30 is aligned with and adhered to the top surface 11 of the touch sensor panel 10. The light guide plate 20 and the touch sensor plate 10 are attached on each other through the first surface 31 and the second surface 32 of the adhesive layer 30.

The shielding body 40 is installed on the outer periphery part 14 of the touch sensor panel 10. In addition, the shielding body 40 is aligned with the edge part 22 of the light guide plate 20. Preferably, the shielding body 40 surrounds and shields the edge part 22 of the light guide plate 20. Consequently, after the light beam 51 from the light-emitting element 50 is introduced into the light guide plate 20, the light beam 51 will not be leaked from the edge part 22 of the light guide plate 20. Optionally, after the shielding body 40 is arranged around the touch sensor panel 10 and the light guide plate 20, a curable opaque, or reflective gel is coated on the outer periphery part 14 of the touch sensor panel 10 and the edge part 22 of the light guide plate 20 in a glue seal manner. Since the edge part 22 of the light guide plate 20 is sealed, the edge part 22 of the light guide plate 20 is opaque, or the edge part 22 of the light guide plate 20 has the ability to reflect the light beam 51 back to the light guide plate 20. In another embodiment, the shielding body 40 is an airtight and opaque frame to surround the outer periphery part 14 of the touch sensor panel 10 and the edge part 22 of the light guide plate 20. Since the edge part 22 of the light guide plate 20 is sealed and blocked by the airtight and opaque frame, the edge part 22 of the light guide plate 20 is opaque or has the light reflection function.

After the touch sensor panel 10 and the light guide plate 20 are combined together through the adhesive layer 30, the shielding body 40 is installed on the outer periphery part 14 of the touch sensor panel 10 and the edge part 22 of the light guide plate. Consequently, the region between the touch sensor panel 10 and the light guide plate 20 is in an airtight seal condition. Under this circumstance, the adhesive layer 30 between the touch sensor panel 10 and the light guide plate 20 provides the function to guide the gas bubbles to the surroundings. As mentioned above, the groove part 33 of the adhesive layer 30 is in communication with the surroundings through the at least one opening 13 of the touch sensor panel 10. Consequently, any residual gas or gas bubble between the touch sensor panel 10 and the light guide plate 20 will be guided by the groove part 33 of the adhesive layer 30 and exited to the bottom surface 12 of the touch sensor plate 10 and the surroundings through the at least opening 13 of the touch sensor plate 10. Moreover, the light beam 51 transferred in the light guide plate 20 will not be leaked out.

As mentioned above, the groove part 33 of the adhesive layer 30 and the shielding body 40 in the touch module 1 of the present invention are specially designed. After the touch sensor panel 10 and the light guide plate 20 are combined together through the adhesive layer 30, the region between the touch sensor panel 10 and the light guide plate 20 is in the airtight seal condition the gas. Consequently, gases will not pass through the periphery seam of the touch module 1 to affect the operations of the touch module 1. In addition, the gas bubbles between the touch sensor panel 10 and the light guide plate 20 can be guided to the surroundings. Moreover, the light beam 51 transferred in the light guide plate 20 will not be leaked out from the periphery region of the touch module 1.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A touch module, comprising:
   a touch sensor panel comprising a top surface, a bottom surface and at least one opening;
   a light guide plate comprising a connecting surface and an edge part, wherein the light guide plate is located over the touch sensor panel, and the connecting surface of the light guide plate is aligned with the top surface of the touch sensor panel;
   an adhesive layer comprising at least one groove part, wherein the adhesive layer is arranged between the touch sensor panel and the light guide plate, and the touch sensor panel and the light guide plate are attached on each other through the adhesive layer; and
   a shielding body arranged between the touch sensor panel and the light guide plate, wherein the edge part of the light guide plate is surrounded by the shielding body,
   wherein the at least one groove part of the adhesive layer is in communication with the at least one opening of the touch sensor panel,
   wherein the at least one groove of the adhesive layer is in communication with surroundings through one opening of the touch sensor panel.

2. The touch module according to claim 1, wherein the touch module further comprises at least one light-emitting element, and the at least one light-emitting element is installed on the touch sensor panel and aligned with the edge part of the light guide plate, wherein when the at least one light-emitting element emits a light beam, the light beam is introduced into the light guide plate through the edge part of light guide plate.

3. The touch module according to claim 2, wherein the shielding body surrounds and shields the edge part of the light guide plate, wherein after the light beam from the light-emitting element is introduced into the light guide plate, the light beam is blocked by the shielding body, so that the light beam is not leaked from the edge part of the light guide plate.

4. The touch module according to claim 1, wherein the top surface and the bottom surface of the touch sensor panel are opposed to each other, the top surface of the touch senor panel is aligned with the adhesive layer and the light guide plate, the at least one opening of the touch sensor panel is extended from the top surface to the bottom surface, and the at least one opening of the touch sensor panel is in communication with surroundings through the bottom surface of the touch sensor panel.

5. The touch module according to claim 1, wherein each of the at least one opening of the touch sensor panel has a first end and a second end, wherein the first end is formed in the top surface of the touch sensor panel, and the second end is formed in the bottom surface of the touch sensor panel, wherein the first end of each of the at least one opening is in communication with the corresponding groove part of the adhesive layer, and the second end of each of the at least one opening is in communication with surroundings.

6. The touch module according to claim 1, wherein the adhesive layer has a first surface and a second surface, and the first surface and the second surface of the adhesive layer are opposed to each other, wherein the first surface of the adhesive layer is aligned with the connecting surface of the light guide plate, and the second surface of the adhesive layer is aligned with the top surface of the touch sensor panel.

7. The touch module according to claim 6, wherein the at least one groove part of the adhesive layer is extended from the first surface of the adhesive layer to the second surface of the adhesive layer, so that the first surface and the second surface of the adhesive layer are in communication with each other.

8. The touch module according to claim 1, wherein the touch sensor panel comprises an outer periphery part, and the outer periphery part surrounds an outer periphery region of the touch sensor panel, wherein the shielding body is installed on the outer periphery part of the touch sensor panel and arranged around the edge part of the light guide plate.

9. The touch module according to claim 8, wherein the touch senor panel further comprises a conductive part, wherein the conductive part is installed on the outer periphery part of the touch senor panel, and the conductive part is aligned with the shielding body.

* * * * *